United States Patent [19]

Wimmer et al.

[11] 4,017,861
[45] Apr. 12, 1977

[54] GROUND STATION FOR A VOR NAVIGATION SYSTEM WITH MEANS FOR IDENTIFYING SPURIOUS RESPONSES AT A REMOTE VOR RECEIVER

[75] Inventors: Leopold Wimmer, Norderstedt; Günter Höfgen; Werner Poschadel, both of Kornwestheim, all of Germany

[73] Assignee: International Standard Electric Corporation, New York, N.Y.

[22] Filed: Dec. 10, 1975

[21] Appl. No.: 639,254

[30] Foreign Application Priority Data

Dec. 11, 1974  Germany .......................... 2458708

[52] U.S. Cl. .......................................... 343/106 R
[51] Int. Cl.$^2$ .......................................... G01S 1/44
[58] Field of Search ................................ 343/106 R

[56] References Cited
UNITED STATES PATENTS 3,743,971  7/1973  Hemme ...................... 343/106 R

*Primary Examiner*—Maynard R. Wilbur
*Assistant Examiner*—T. M. Blum
*Attorney, Agent, or Firm*—William T. O'Neil

[57] ABSTRACT

A ground station for VOR navigation systems with at least one transmitter and several radiators, which ground station radiates azimuth-dependent and azimuth-independent information. The azimuth-dependent information consists of the wave amplitude-modulated with 30 Hz in the field and generated by the superposition of the nondirectionally radiated VHF carrier on a VHF figure-8 directional pattern rotating at 30 Hz. The azimuth-independent reference wave consists of a 30-Hz wave which is contained as frequency modulated in a 9,960-Hz subcarrier wave amplitude-modulated on the VHF carrier. For the on-board identification of the simulated VOR signals radiated by the ground station and consisting of harmonics of the modulation frequencies of a VOR station transmitting on a first channel, the unmodulated carrier wave is amplitude-modulated, with the frequency of this modulation lying between the frequencies of the harmonics of the modulation frequency which occur at the limits of the bandwidth of the receiver set to a second channel adjacent to the first channel.

13 Claims, 7 Drawing Figures

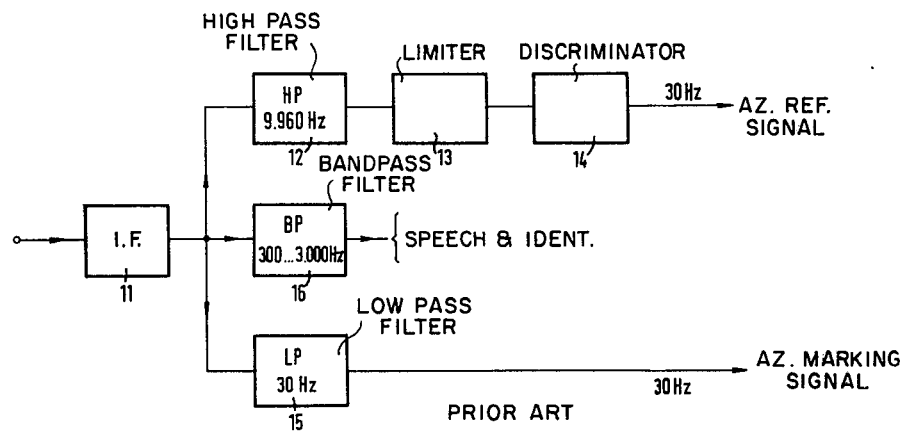
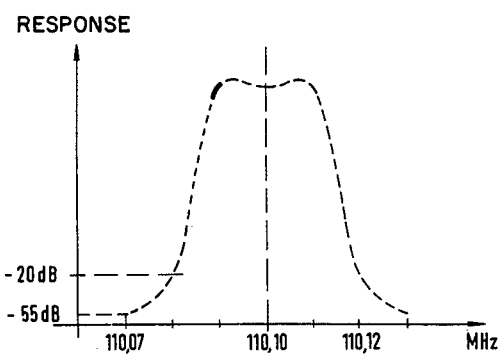
Fig.2a
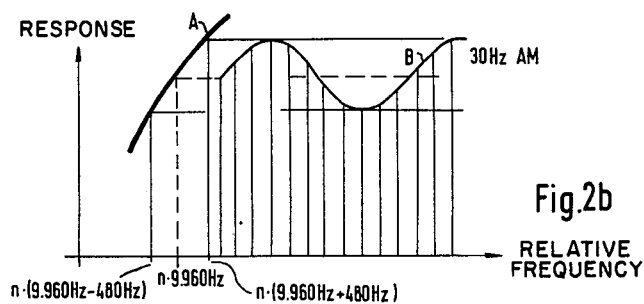
Fig.2b

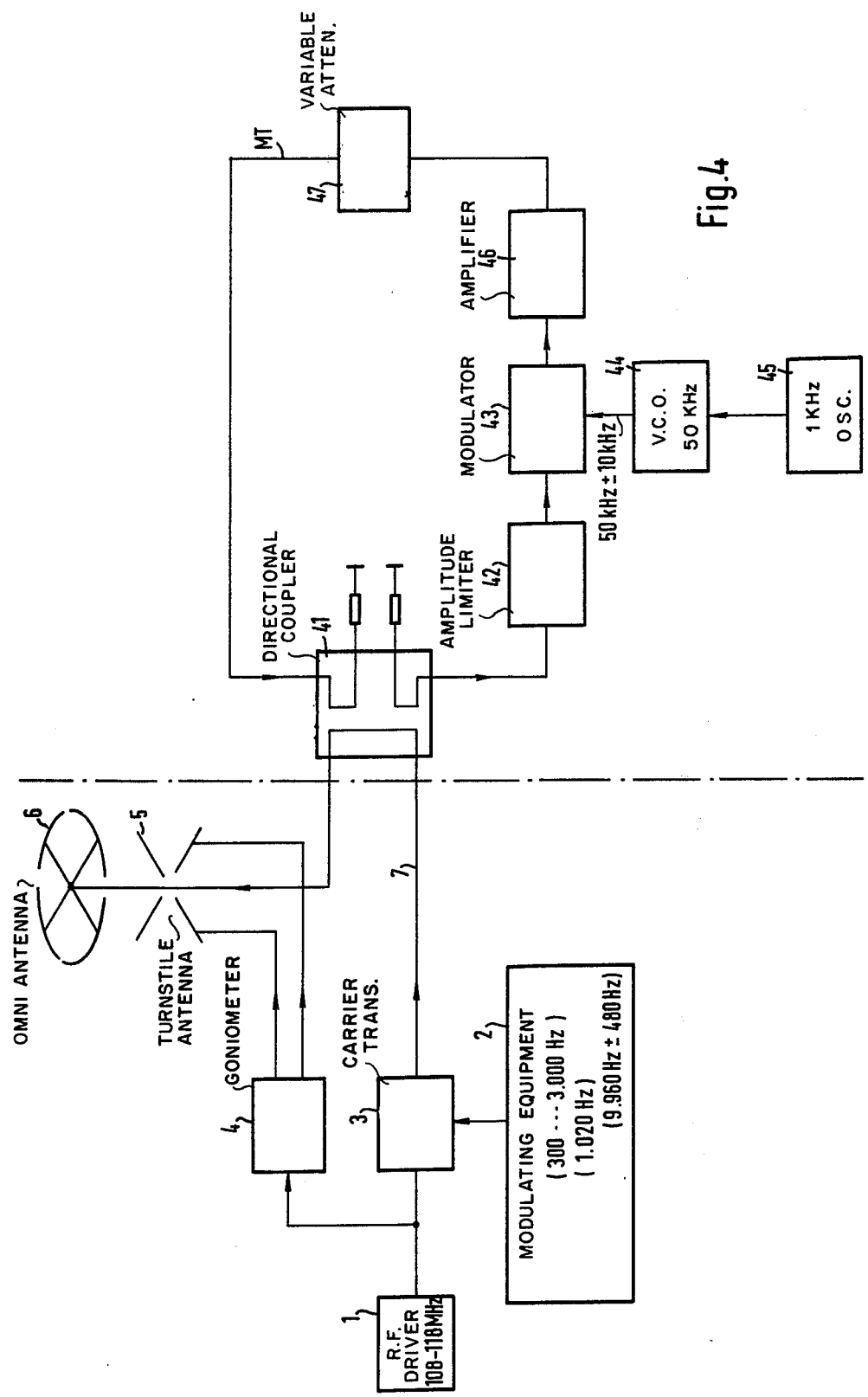

GROUND STATION FOR A VOR NAVIGATION SYSTEM WITH MEANS FOR IDENTIFYING SPURIOUS RESPONSES AT A REMOTE VOR RECEIVER

BACKGROUND OF THE INVENTION

The present invention relates to a ground station for a VOR navigation system with at least one transmitter and several radiators which ground station radiates azimuth-dependent and azimuth-independent information, the azimuth-dependent information consisting of the wave amplitude-modulated with 30 Hz in the field and generated by the superposition of the nondirectionally radiated VHF carrier on a VHF figure-8 directional pattern rotating at 30 Hz, and the azimuth-dependent reference wave consisting of a 30-Hz wave which is contained as frequency modulation in a 9,960-Hz subcarrier wave amplitude-modulated on the VHF carrier.

Such ground stations as known in the prior art are described in a book by E. Kramar, "Funksysteme fur Ortung und Navigation", Verlag Berliner Union GmbH, Stuttgart (1973), on pages 131 to 137.

The VOR navigation system operates in the frequency region from 108 to 118 MHz. The channel spacing is 100 kHz. As a result of the increase in air traffic, more and more VOR stations are being installed; as a consequence, the number of channels is no longer sufficient. To be able to install more VOR ground stations in the available frequency region from 108 to 118 MHz, the channel spacing must be reduced to 50 kHz.

With this reduced channel spacing, disturbances may occur which are not present with the present channel spacing of 100 kHz. The possible disturbances occur under the following conditions:

a. An airborne receiver has been set by mistake to an vacant adjacent channel separated by 50 kHz. In this vacant adjacent channel, the harmonics of the modulation frequency which fall within this channel may still have such amplitudes as to result in a stable, but false indication. There may be no indication of the disturbance by the flag alarm.

b. Navigation is to be effected with the aid of a very distant VOR station. The weak signal of this very distant VOR station and the above-mentioned harmonics of a close VOR station are in the same channel. There may be a superposition of the two signals and, consequently, a false indication.

These disturbances (anomalies) will be explained in more detail in the description.

OBJECT

It is the object of the invention set forth in the claims to prevent navigation errors due to false indication especially in a close-spaced channel VOR system. False readings are to be indicated aboard the airplane audibly and/or by the flag alarm.

SOLUTION

The object is attained by the means set forth in the claims.

ADVANTAGE

The risk of the safety of navigation using close-spaced channel VOR being endangered by false indications is avoided. The installation according to the invention can be easily added to existing ground stations. No changes are necessary aboard the airplane, except for channel selection.

BRIEF DESCRIPTION OF THE DRAWINGS

The invention will now be explained in more detail and by way of example with reference to the accompanying drawings, in which:

FIG. 1 is a block diagram of a known VOR receiver;

FIGS. 2a and 2b show the passband of the i-f section of a VOR receiver in overall and magnified form, respectively.

FIG. 4 Is a block diagram of a known VOR ground station with the device in accordance with the invention, FIG. 5 Illustrates an improvement of the device of FIG. 4.

Figure 3A:
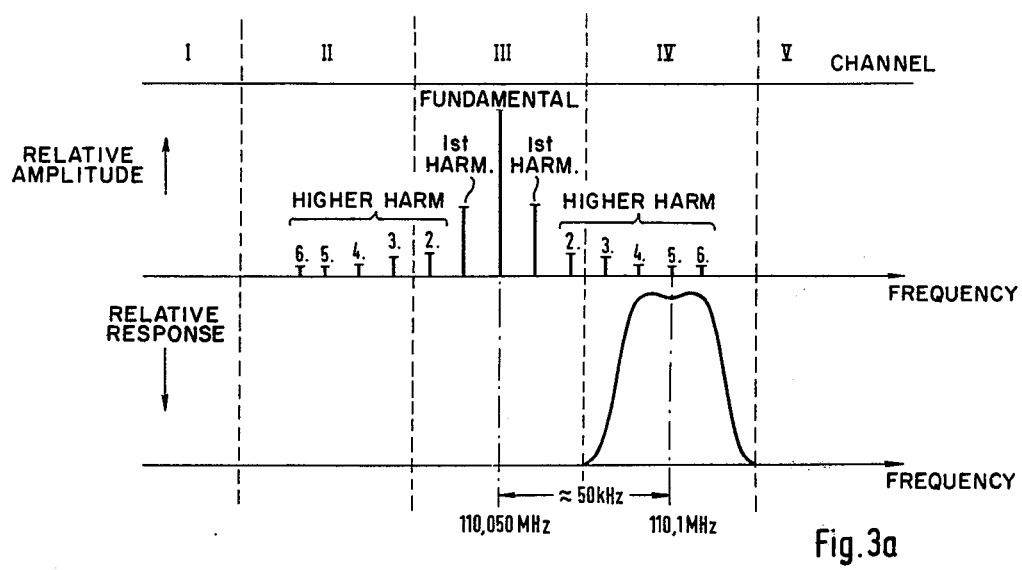
FIGS. 3a and 3b show the amplitudes of VOR signals and of harmonics of the modulation frequency as well as the passband of an airborne receiver set to the channel IV.

For a better understanding of the causes of the disturbance (spurious response), the operation of a VOR ground station and, with the aid of FIG. 1, the design of a conventional VOR airborne receiver will be briefly described first.

The VOR signal generated in the VOR ground station consists of the VHF carrier, amplitude-modulated as a function of the azimuth, and the azimuth-independent, omnidirectional carrier, which is amplitude-modulated with the subcarrier.

The azimuth-dependent portion of the VOR signal, amplitude-modulated with 30 Hz, is obtained by superimposing the non-directionally radiated VHF carrier on the VHF figure-8 directional pattern rotating at 30 Hz. The azimuth-independent 30-Hz reference wave is contained as frequency modulation in a 9,960-Hz subcarrier wave with a frequency deviation of ± 480 Hz, which is amplitude-modulated on the above-mentioned VHF carrier. In addition, the VHF carrier is amplitude-modulated with speech and identification signals.

During the amplitude modulation of the carrier with the frequency-modulated subcarrier, sidebands and harmonics of the modulation frequency are produced. The harmonics are caused by the inherently nonlinear modulation characteristic.

The frequency separation between the harmonics and the carrier is n.9,960 Hz ± n.480 Hz, where n is the ordinal number of the harmonic. The harmonic spacing is thus equal to the distance between sideband and carrier.

The processing of the VOR signals in the airborne receiver will now be described with the aid of FIG. 1. The block diagram of FIG. 1 shows only those parts (i-f section 11, high-pass filter 12, limiter 13, discriminator 14, low-pass filter 15, band-pass filter 16) which are thought necessary for an understanding of the operation of the airborne receiver.

When the receiver receives a VOR signal, consisting of the carrier with sidebands (1st harmonic), this signal, after having been converted to the intermediate frequency, passes through the i-f section 11. In this i-f section, the frequency modulation in the subcarrier may lead to a partial conversion into a 30-Hz amplitude modulation. The causes of this amplitude modulation will be explained in more detail below with reference to FIG. 2b. Having passed through the high-pass filter 12, the subcarrier is so limited in the limiter 13 that the 30-Hz amplitude modulation is eliminated. The 30 Hz of the frequency-modulated wave is obtained in the discriminator 14. This 30-Hz wave is the azimuth-independent wave (reference signal) needed to measure the azimuth. By means of the low-pass filter 15, the azimuth-dependent wave (amplitude-modulated with 30 Hz) is filtered out of the signal amplified in the i–f section 11. The remaining modulation frequencies, containing speech and identification, are filtered out by means of the band-pass filter 16. The bandwidth of the receiver is such that, if the receiver is set to the channel of the desired VOR ground station, the carrier with its two sidebands is passed and processed. It is possible, however, that harmonics of a VOR ground station transmitting at an adjacent frequency channel could fall within this bandwidth.

The 30-Hz amplitude modulation of the subcarrier, caused by the i–f section 11, will now be explained with reference to FIG. 2. FIG. 2a shows the passband of the i–f section 11. Curve A of FIG. 2b corresponds to the solid portion of the curve of FIG. 2a magnified for clarity. The frequency spectrum of the subcarrier extends from 9,960 Hz-480 Hz to 9,960 Hz +480 Hz. From the passband slope characteristic follows the above-mentioned 30 Hz amplitude modulation (characteristic B) of the subcarrier illustrated in FIG. 2b.

The two cases which cause a false indication, namely
1. false setting of the airborne receiver, and 2. superposition of signals, will now be described with reference to FIG. 3.

CASE 1

Figure 3B:
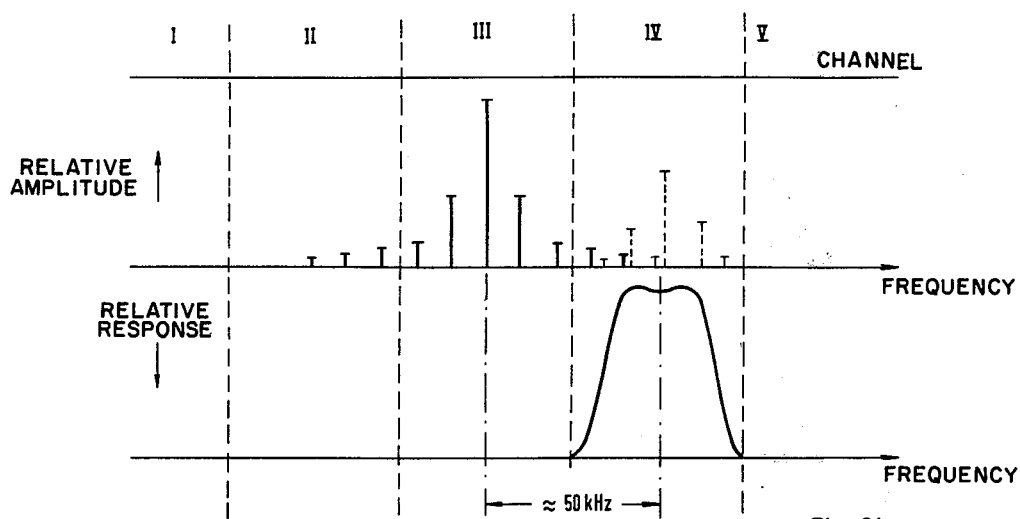

Assume that the aircraft is to be navigated with the aid of a VOR ground station transmitting on channel III (FIG. 3a), and that the airborne receiver has been erroneously set to channel IV. The 4th, 5th and 6th harmonics lie in the passband of the airborne receiver (FIG. 3a). These two harmonics simulate a VOR signal of the VOR ground station transmitting on channel III.

As mentioned earlier, the passband of the i–f section has the characteristic shown in FIG. 2a. In FIG. 2b, for this example (4th harmonic), $n = 4$. In the i–f section 11, the 4th harmonic is converted to 30 Hz amplitude modulation, as described above. This 4th harmonic amplitude-modulated with 30 Hz simulates (in the airborne equipment) the carrier amplitude-modulated with 30 Hz and is filtered out by means of the low-pass filter 15 (FIG. 1). The 5th harmonic, like the subcarrier of a VOR signal, is filtered out by the high-pass filter 12 and processed by the limiter 13 and the discriminator 14, since the distance between the 5th harmonic and the 4th harmonic is 9,960 Hz ± 480 Hz, i.e., equals the distance between carrier and sideband in the case of a "genuine" VOR signal.

Since the airborne equipment cannot determine that both 30-Hz waves derived therein are azimuth-independent, the azimuth indicated in the indicating device does not give the correct bearing or direction of flight. The identification of the VOR station transmitting on channel III may be also received.

CASE 2

Navigation is to be performed with the aid of a VOR ground station remote from the aircraft and transmitting (FIG. 3b) on channel IV. In addition, a VOR ground station transmitting on channel III is located near the aircarft. In this case, the receiver, set to channel IV, receives, in addition to the desired signals, harmonics of the VOR station transmitting on channel III, because the frequencies of these harmonics nearly coincide with the frequencies of the VOR signal of channel IV and are strong. The amplitudes of the harmonics are dependent on the distance of the airborne equipment from the ground station. As a result of the harmonics being superimposed on the VOR signals of the remote station, the azimuth-determining phase of the 30-Hz carrier modulation is falsified; consequently, the azimuth indication becomes false.

By the existing means, it is not possible to identify the signal consisting of the harmonics as an undesired signal (case 1). Nor is it possible to determine whether the harmonics are superimposed on a genuine VOR signal (case 2). In either case, the flag alarm indicates no disturbance (anomaly) because the preconditions for an indication by the flag alarm (incoming-signal level too low, absence of two 30-Hz waves, some of the amplitudes of the two 30-Hz waves below a predetermined value) are not extant.

The device for identifying the unrecognized disturbance condition will now be described with reference to FIG. 4.

The left half of the block diagram of FIG. 4 shows the known parts of a VOR ground station, i.e. driver 1, modulating equipment 2, carrier transmitter 3, goniometer 4, turnstile antenna 5, omnidirectional antenna 6 and feeder 7. Their operation is described in the aforementioned text reference, particularly on page 137 and, therefore, will not be explained here.

Part of the modulated carrier signal, which is applied from the carrier transmitter 3 via the feeder 7 to the omnidirectional antenna 6, is coupled out by the first loop of a directional coupler 41 and so limited in an amplitude limiter 42 that the unmodulated carrier wave is available at the output of the amplitude limiter 42. An oscillator 45 frequency-modulates a voltage-controlled oscillator 44 with a frequency of 1 kHz. The oscillator 44 normally oscillates at 50 kHz. The frequency modulation generates a frequency deviation of 10 kHz. The output frequency of the oscillator 44 thus varies between 40 kHz and 60 kHz. In a modulator 43, it is used to amplitude-modulate the carrier frequency. The carrier wave so modulated is amplified in an amplifier 46 and brought to a suitable output amplitude in a variolosser (variable attenuator) 47. This signal MT is coupled into the feeder 7 via the second loop of the directional coupler 42 and radiated by an omidirectional antenna 6.

The amplitude of the signal MT is greater than the amplitudes of the 4th and 5th harmonics. Since the airborne receiver (FIG. 1) processes the frequency with the greatest amplitude as the carrier, the signal so generated performs the function of the carrier.

The frequency of this carrier varies between ± 40 kHz and ± 60 kHz in relation to the carrier of the VOR station transmitting on channel III. By the 4th harmonic, a sideband is simulated. As the distance between the above-mentioned carrier and the simulated sideband varies between 0 and 20 kHz and thus does not have the required value, these waves cannot be processed in the receiver as the carrier and the sideband; hence, it is not possible to derive two 30-Hz waves. Thus, one precondition for a warning by the flag alarm has been fulfilled. The erroneous setting of the airborne receiver to channel IV is detected.

Figure 5:
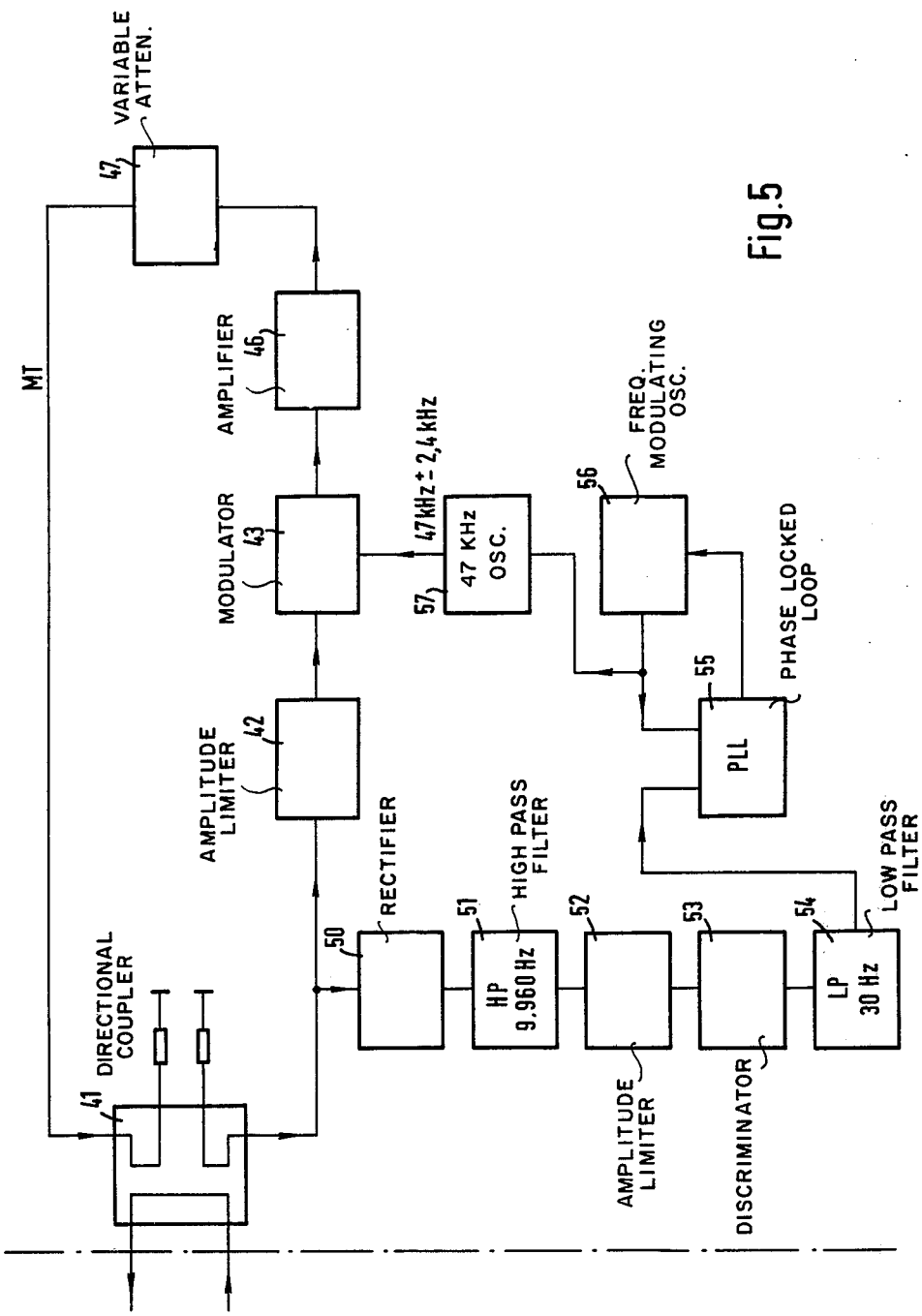

With this device, the disturbance is indicated by the flag alarm. In the improvement of FIG. 5, the disturbance is to be indicated by the flag alarm and by an audible signal.

In this improvement, part of the modulated carrier wave is branched off from the directional coupler 42 and passed to a rectifier 50 and a high-pass filter 51, in which the subcarrier is filtered out. An amplitude limiter 52 following the high-pass filter 51 eliminates the amplitude modulation of the subcarrier, and a discriminator 53 following the amplitude limiter 52 derives the 30-Hz frequency with which the subcarrier is frequency-modulated. This 30-Hz wave is passed through a low-pass filter 54 to a phase-locked loop 55.

The oscillator 44 of FIG. 4 has been replaced with an oscillator 57 whch oscillates at a frequency of 47 kHz. The oscillator 57 is frequency-modulated by an oscillator 56, which replaces the oscillator 45 of FIG. 4. The frequency deviation is 5. (±480) Hz. As in the arrangement of FIG. 4, the unmodulated carrier is amplitude-modulated, in the modulator 43, with the output frequency of the oscillator 57.

The phase-locked loop 55 controls the oscillator 56 so that the latter oscillates synchronously with the 30-Hz wave, with which the subcarrier is frequency-modulated.

Through this synchronization, the spacing between the frequency of the signal MT (FIG. 5) and that of the 5th harmonic can be kept constant. With the above chosen numbers, this spacing is 3 kHz, i.e., a 3-kHz tone can be heard in the receiver headphone. Since the frequency deviation of the 5th harmonic is ± 2.4 kHz, the frequency deviation of the output signal of the oscillator 57 must also be ± 2.4 kHz. If the oscillator 56 does not oscillate synchronously with the 30-Hz wave, with which the subcarrier is frequency-modulated, a tone of varying frequency will be heard in the headphone.

By this 3-kHz tone, the disturbance is detected aboard the airplane. An identification differing substantially from the station identifications may be impressed on the 3-kHz tone by automatic keying.

The amplitude of the signal $MT^x$ is adjusted so as to exceed the amplitude of the 5th harmonic. Thus, this signal takes over the function of the carrier, as described above. The distance from the simulated sidebands (4th to 6th harmonics) varies and, in addition, does not have the required value of 9,960 Hz±480 Hz. Consequently, for the reasons explained above, the flag alarm will give a warning. The disturbance of the VOR signal is thus indicated audibly and by the flag alarm.

If the false indication results from the harmonics (of the VOR station transmitting on channel III) being superimposed on a VOR signal (channel IV), the above described devices of FIGS. 4 and 5 will detect this disturbance, too.

If the aircraft is located at such a distance from the VOR station transmitting on channel III that the amplitude of the signal MT (in the device of FIG. 4) is substantially smaller than the amplitudes of the sidebands of the VOR station transmitting on channel IV, the signal of the VOR station transmitting on channel IV can be processed undisturbed.

What is claimed is:

1. In a ground station for VOR navigation having at least one transmitter and a plurality of radiating devices, said station radiating azimuth-dependent and azimuth-independent information, said azimuth-dependent information comprising a wave effectively amplitude-modulated at 30 Hz in the field, said azimuth-dependent information being generated by superposition of a nondirectionally radiated VHF carrier on a VHF figure-eight directional pattern, the latter being effectively rotated at an equivalent rate of 30 Hz, and said azimuth-independent reference wave comprising a 30 Hz wave contained as frequency modulation on a 9960 Hz subcarrier wave, said frequency modulated wave being a subcarrier itself contained on said VHF carrier by amplitude modulation, the combination comprising:

first means responsive to said VHF carrier for diverting a portion of said carrier and for eliminating modulation therefrom to provide an unmodulated VHF signal at the frequency of said carrier;

and second means for amplitude modulating said unmodulated VHF signal to produce a first remodulated signal with a frequency lying between the frequencies of a pair of harmonics of the modulation frequency occurring at the limits of the bandwidth of a responsive airborne receiver set to a channel adjacent to the channel of transmission of said transmitter.

2. Apparatus according to claim 1 in that means are provided for also frequency modulating said first remodulated signal.

3. Apparatus according to claim 2 in which means are included for providing said frequency modulation of said first remodulated signal in phase with the waves of said azimuth-dependent information.

4. Apparatus according to claim 1 in which the frequency spacing between said first remodulated signal and the frequency of said harmonic which lies nearest the center of the passband of said airborne receiver when said receiver is set to said adjacent channel, is within the audible frequency range.

5. Apparatus according to claim 3 in which the frequency spacing between said first remodulated signal and the frequency of said harmonic which lies nearest the center of the passband of said airborne receiver when said receiver is set to said adjacent channel, is within the audible frequency range.

6. Apparatus according to claim 3 in which the frequency deviation of said remodulated signal during said frequency modulation is equal to that of said harmonic.

7. Apparatus according to claim 4 in which the frequency deviation of said remodulated signal during said frequency modulation is equal to that of said harmonic.

8. Apparatus according to claim 4 in which said second means is arranged to be distinctively keyed automatically, thereby to provide an audio tone through said airborne receiver which is distinguishable from VOR station identifying signals to indicate a condition of operational disturbance during which reliable VOR data cannot be derived at said airborne receiver.

9. Apparatus according to claim 1 in which said means within said first means for diverting a portion of said carrier comprises a directional coupler having its main parts connected between said transmitter of said VHF carrier and at least one of said radiating means, said coupler having a port providing said diverted portion to said modulation eliminating means.

10. Apparatus according to claim 9 in which said modulation eliminating means is a limiter.

11. Apparatus according to claim 2 in which means are provided for coupling said first remodulated signal into one of said radiating devices for radiation to said airborne receiver.

12. Apparatus according to claim 9 in which means including an additional port in said coupler are provided for radiating said first remodulated signal as a part of the transmitted signal format of said ground station.

13. In a VOR ground station which radiates signals modulated in the VOR format, including azimuth-dependent and azimuth-independent information, said azimuth-dependent information including a wave effectively amplitude-modulated at 30 Hz in space, said azimuth-dependent information being generated by superposition of an omni-directionally radiated VHF carrier on a VHF figure-eight pattern, the latter being effectively rotated at a rate of 30 Hz, and said azimuth-independent reference wave comprising said VHF carrier amplitude modulated by a subcarrier high in frequency compared to said 30 Hz but low in frequency compared to said VHF carrier, said subcarrier being frequency modulated by a 30 Hz wave having a fixed phase relationship with respect to the signal of said 30 Hz effective rate, comprising:

transmitting modulating and antenna means for generating and radiating said azimuth-dependent information and said azimuth-independent reference wave;

and means for providing an unmodulated signal at said VHF carrier frequency, and for producing a first remodulated signal therefrom, the modulation frequencies of said remodulated signal including a frequency lying between the frequencies of a pair of harmonics of said VOR format modulation occurring at the limits of the bandwidth of a responsive airborne receiver set to a channel adjacent to the channel of transmission of said VOR ground station.

* * * * *